United States Patent [19]
Diehl et al.

[11] Patent Number: 6,052,666
[45] Date of Patent: Apr. 18, 2000

[54] VOCAL IDENTIFICATION OF DEVICES IN A HOME ENVIRONMENT

[75] Inventors: Eric Diehl, Chantepie; Gérard Corda, Rennes, both of France

[73] Assignee: Thomson multimedia S.A., France

[21] Appl. No.: 08/728,488

[22] Filed: Oct. 9, 1996

[30] Foreign Application Priority Data

Nov. 6, 1995 [EP] European Pat. Off. .............. 95402468

[51] Int. Cl.$^7$ ...................................................... G10L 7/08
[52] U.S. Cl. .......................................... 704/275; 704/270
[58] Field of Search .................................. 704/270, 275, 704/272, 258, 274

[56] References Cited

U.S. PATENT DOCUMENTS

| | | | |
|---|---|---|---|
| 4,513,189 | 4/1985 | Ueda et al. | 704/275 |
| 4,520,576 | 6/1985 | Vander Molen | 704/275 |
| 4,703,306 | 10/1987 | Barritt | 340/310 |
| 4,776,016 | 10/1988 | Hansen | 704/275 |
| 4,944,211 | 7/1990 | Rowan et al. | 89/8 |
| 5,086,385 | 2/1992 | Launey et al. | 704/270 |
| 5,199,080 | 3/1993 | Kimura et al. | 704/275 |
| 5,247,580 | 9/1993 | Kimura et al. | 704/275 |
| 5,583,965 | 12/1996 | Douma et al. | 704/275 |
| 5,621,662 | 4/1997 | Humphries et al. | 704/270 |
| 5,632,002 | 5/1997 | Hashimoto et al. | 704/231 |

FOREIGN PATENT DOCUMENTS 0496492 of 0000 European Pat. Off. .

OTHER PUBLICATIONS

Funkschau, "Stadtpilot", Mar. 1994, pp. 49 and 51 translated into English language.

Jei, Jun. 1993, "Latest Karaoke Systems Adopt New Media for Enhanced Functions." pp. 44–47.

Electronics World & Wireless World, "Car navigation systems are on course", Nov. 1994, p. 884.

AT&T Definity® and System 75, Communications System Generic 1 and Generic 3, 7406 Plus Voice Terminal User's Guide, pp. 4 and 15, AT&T 555–230–741, Issue 1, Jun. 1992.

IEEE Transactions on Industry Applications, vol. ia–19, No. 1, Jan. '83–Feb. '83, pp. 136–141, D. Baker "Voice Synthesis Appliances; apragmatic analysis".

Journal of the Acousticall Society of America, vol. 82, No. 3, Sep. 1987, NY, USA, pp. 737–793, D.H. Klatt "Review of the Text to Speech Conversion for English".

*Primary Examiner*—Richemond Dorvil
*Attorney, Agent, or Firm*—Joseph S. Tripoli; Peter M. Emanuel; David T. Shoneman

[57] ABSTRACT

A speech based man-machine communication system is given, comprising more than one controllable device provided with speech synthesis function. Each of the devices in question is provided with its own unique voice pattern. The devices are connected via a bus, so that a central authority handles all the requests from the user. Because the user uses his natural language, commands can be ambiguous. Therefore an algorithm for handling ambiguous situations is provided.

6 Claims, 2 Drawing Sheets

VOCAL IDENTIFICATION OF DEVICES IN A HOME ENVIRONMENT

FIELD OF THE INVENTION

The invention relates to the vocal identification of controllable devices, especially in a home environment, and in particular to a speech-based man-machine communication system and a method for determining a target device out of a plurality of devices and communicating with such a device.

BACKGROUND OF THE INVENTION

Currently the control of controllable devices, especially consumer devices like VCRs, TV sets or CD players, is performed by the use of one or more remote control units which deliver the information or commands in most cases via an IR (infrared) beam. The feedback of the chosen device to the user is normally provided via an optical display of the action resulting from the command. Other man-machine interfaces are known, for example when a computer controls a certain amount of devices, which need not necessarily be consumer devices, wherein the interface between the man and the machine is usually provided via a keyboard, a mouse and a screen, with which a central processing unit controls the connected devices via programs.

Because of the increasing number and complexity of the consumer devices the above man-machine interfaces are not very user-friendly. One way to enhance the user-friendliness of a user interface is to increase the number of senses that the user interface appeals to. One of the most promising natural input/output possibility is the speech interface.

Voice can be used both for the command, with speech recognition, and for the feedback through voice synthesis. The current applications using voice synthesis are designed for an environment managing only one device. In this known case the device is equipped with a speech recognition and a voice synthesis system. Such solutions are known for example from the field of robotics. In contrast, a consumer household usually comprises a plurality of different devices, which can be controllable in principle. This poses the problem of how to identify the different controllable devices in a dialogue between the user and the devices, if a voice-based man-machine interface is used.

SUMMARY OF THE INVENTION

It is therefore an object of the present invention to provide a voice-based man-machine communication system which establishes a "natural" dialogue between the user and his home devices.

This object is solved by the subject matter of the independent claims. Preferred embodiments of the invention are subject of the dependent claims.

The vocal feedback can occur mainly in two circumstances:

Generation of a help function for the customer, for example the device may provide guidance while the user performs a complex task.

Inform or warn the user at a time when the user may not be focusing his attention to the device concerned.

In the known mono-device environment this is straightforward because the single device delivers its message. In a multi-device environment each device has to provide one additional information, namely the identification of the device issuing the message. This identification of the device is given by the characterizing feature of claim 1, wherein each controllable device is provided with its own unique voice. In other words, each device has its own voice synthesizer, which can synthesize the voice of this particular device in such a way, that it is possible to identify this device. This is very convenient for the user, because in the natural world each person is identified by its own personal voice. Therefore the message delivered by the device contains implicitly the identification information for the issuer.

Furthermore this vocal identification can be enhanced by providing for each device a voice that fits with the mental image the user has from the device. For instance, in France the TV set (la télé) is perceived as a female device whereas the VCR (le magnétoscope) is perceived as a male device. In this case, it would be advantageous to provide a female voice for the TV set and a male voice for the VCR. Further it is possible to equipe each device with several different voices, so that the user chooses the voice he likes better. This does not pose any problem, because it is possible to program the voice synthesizer this way.

Therefore, the present invention comprises a speech based man-machine communication system with more than one controllable device (25a, 25b) each provided with a speech synthesis (26a, 26b), wherein each controllable device is provided with its own unique voice pattern.

In particular the controllable devices of the man-machine communication system are consumer devices in a home environment, but the invention can be used in other environments.

In a preferred embodiment according to the invention, all devices are linked via a bus. This bus (29) can be realized in a variety of ways, for example in a wire-based electrical fashion, with optical fibres, or with radio or IR beams. To lower the complexity of the inventive speechbased man-machine communication system, the system is provided with one unique central authority (23), which manages all the requests issued by the user. For that purpose the central authority is equipped with a speech recognition (21), collects all the requests issued by the user, and dispatches the commands to the devices concerned (e.g., TV 25a and VCR 25b). These user commands can be directly activated on standard input devices such as remote controllers dedicated to one or several devices or by a vocal message. In that case, the vocal message is directly received and analysed by the central authority. The speech recognition is currently studied in the laboratories and existing solutions are available on the market. This architecture limits the proliferation of the expensive hardware and software for speech recognition.

To achieve a user friendly environment, the vocal interface should stick as much as possible to the natural language.

Although this solution is very attractive, it has a main drawback, mainly that same commands may be understood by different devices. For instance the phrase "switch to program 5" is meaningful for both TV set and VCR.

To avoid confusion of commands, there exists a simple solution in that it is up to the user to state explicitly which device he wants to command. This approach is straightforward, but not very flexible. Therefore according to the invention a more flexible and natural algorithm is used, which will be now described:

When a command is received by the speech recognition, the central authority checks whether the target device was explicitly stated. In that case the command is directed to the called or stated device. Otherwise, the central authority checks whether the command is related to one unique device only. In that case the command is directed to this unique device. Otherwise, the central authority lists all those devices that may understand the command. Each listed device then asks the user in plain language whether the command was dedicated to it. This procedure is continued until the user defines which device he was targeting by giving a positive answer for example. The device list can be generated using a statistical or probability approach. Because each device has its own voice, the user is able to hold a natural dialogue with the device.

A preferred embodiment of the algorithm used by the central authority for selecting the called device will now be described in more detail by way of example, with reference to the drawing, wherein

DETAILED DESCRIPTION OF THE INVENTION

Figure 1:
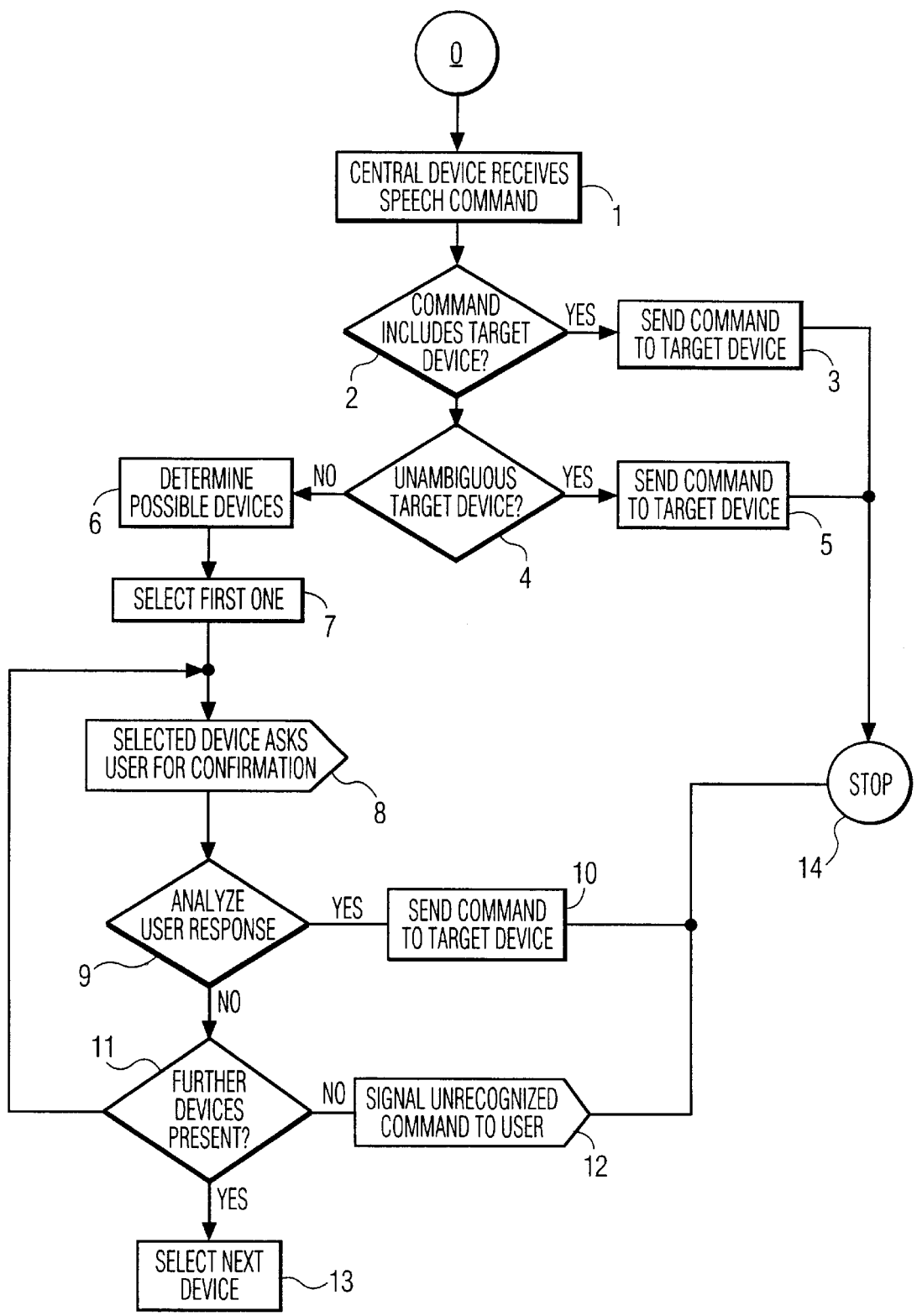
FIG. 1 shows a flow chart of the algorithm used.
Figure 2:
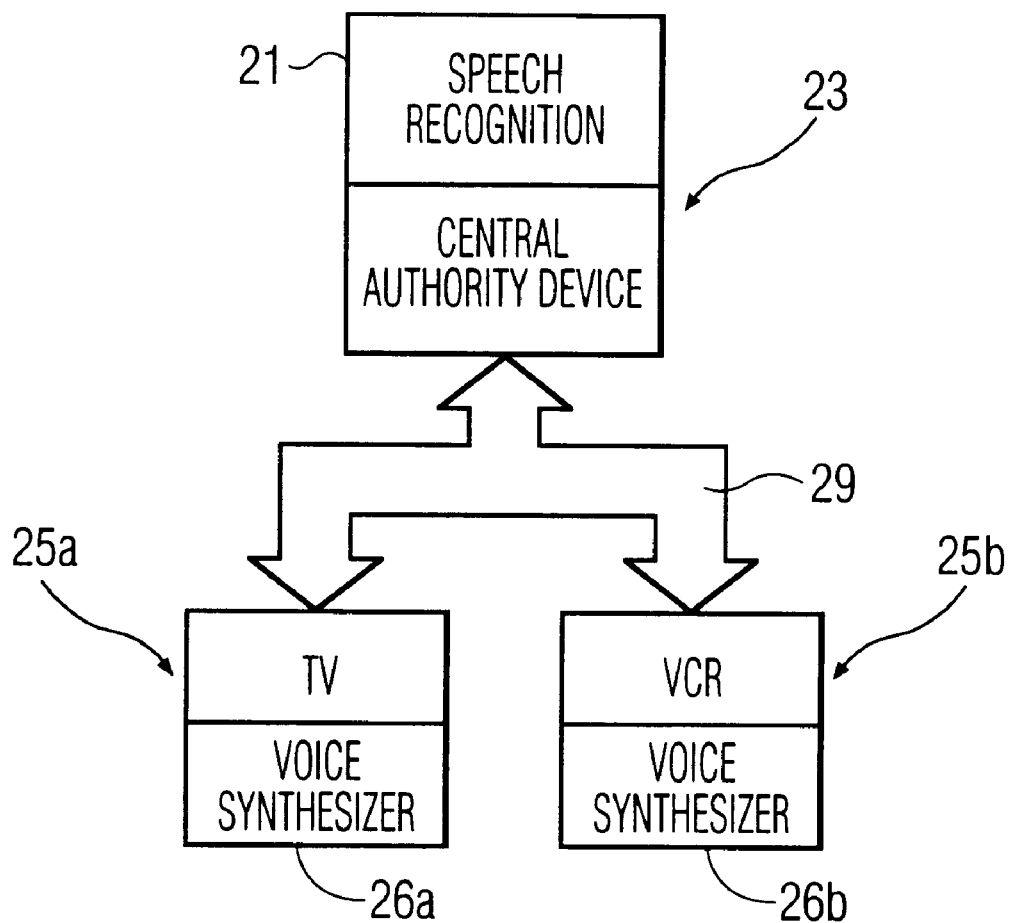
FIG. 2 shows, in simplified block diagram form a communication system utilizing the algorithm of FIG. 1.

FIG. 1 shows a flow chart of the algorithm as it is operated in the central authority, which can be formed by an appropriate computer like a personal computer or a workstation. The algorithm starts with step 0. In step 1 the central authority receives a vocal command from the user. In step 2 this vocal command is analyzed to determine whether the target device is stated or not. This task can be performed if the used devices are named properly. If the answer is yes the central authority sends in step 3 the command to the target device and the algorithm is finished (step 14). If the answer is no the central authority analyzes the command and determines if it is related to a special target device. In other words the central authority checks as a function of the connected devices whether the command is unambiguous. If the answer is yes the algorithm proceeds to step 5, in which the command is sent to the target device. Then the algorithm is finished (step 14). If the answer is no the central authority identifies in step 6 all possible devices, which could be related to the given command. Further in this step 6, the central authority generates a list of the possible target devices. The order of said list can be prescribed or determined by e.g. a statistical approach. In step 7 the first possible target device is selected. Because of a command from the central authority, the so-selected device asks in step 8 for confirmation i.e. its voice synthesis is activated. In step 9 the user's answer is analyzed by the central authority. If the answer is yes the command is sent to the selected device in step 10. The algorithm is then finished (step 14). If the user does not answer with yes or after a predetermined time period has lapsed, the central authority checks in step 11 whether the list of step 6 contains further devices. If the list does not contain any more devices the central authority outputs the user in step 12 the receipt of an unrecognized command. The algorithm is then finished. If there are still more devices in the list the central authority selects in step 13 the next device on the list which then asks the user for confirmation and goes back to step 8.

The process can be optimized. Since the central authority has selected all the concerned devices, it can classify them in the order of decreasing probability. For instance, if the user requests a program to be switched when the TV set is switched on, it is more probable that the command was for the TV set than for the VCR. For this reason the TV set will speak first. If both devices are switched off, the chance is the same for each device.

We claim:

1. A method for controlling a plurality of consumer electronic target devices interconnected via a digital bus to a central authority device, said central authority performing the steps of:

receiving a speech command from a user;

evaluating said received speech command to determine whether one of said target devices is identified;

issuing, in response to said identified target device, a corresponding command from said central authority to said target device;

evaluating said received speech command to determine whether said received speech command is unique to a specific target device;

issuing, in response to said unique received speech command, a corresponding command from said central device to said specific target device; and thereafter generating, in response to said speech command not identifying said target device and not being unique to one of said target devices, a list of target devices capable of being controlled by said received speech command.

2. The method according to claim 1 wherein each of said target devices identified on said list performs the step of:

generating uniquely identifiable speech information in response to said received speech command.

3. The method of claim 2 wherein said uniquely identifiable speech information comprises a feminine accent.

4. The method of claim 2 wherein said uniquely identifiable speech information comprises a masculine accent.

5. The method according to claim 1, wherein the step of generating said list of target devices is generated according to a probability approach.

6. A method for controlling a plurality of consumer electronic target devices interconnected via a digital bus to a central authority device, said central authority performing the steps of:

evaluating a speech command received from a user to determine whether said speech command is unique to a specific target device;

issuing, in response to said unique speech command, a corresponding command from said central device to said specific target device; and thereafter indicating, in response to said speech command not being unique to one of said target devices, which of said target devices is capable of being controlled by said speech command.

\* \* \* \* \*